(12) United States Patent
Britton et al.

(10) Patent No.: US 8,584,243 B2
(45) Date of Patent: Nov. 12, 2013

(54) SYSTEM AND METHOD FOR BIDIRECTIONAL TRUST BETWEEN DOWNLOADED APPLICATIONS AND MOBILE DEVICES INCLUDING A SECURE CHARGER AND MALWARE SCANNER

(75) Inventors: Douglas Britton, Washington, DC (US); Andrew M. Wesie, Arlington, VA (US); Brian S. Pak, Pittsburgh, PA (US)

(73) Assignee: Kaprica Security, Inc., Washington, DC (US)

( * ) Notice: Subject to any disclaimer, the term of this patent is extended or adjusted under 35 U.S.C. 154(b) by 13 days.

(21) Appl. No.: 13/361,153

(22) Filed: Jan. 30, 2012

(65) Prior Publication Data

US 2013/0117854 A1  May 9, 2013

Related U.S. Application Data

(60) Provisional application No. 61/577,699, filed on Nov. 9, 2011, provisional application No. 61/567,320, filed on Dec. 6, 2011, provisional application No. 61/570,585, filed on Dec. 14, 2011.

(51) Int. Cl.
*H04L 29/06* (2006.01)
*G06F 21/00* (2013.01)

(52) U.S. Cl.
USPC ............................................ 726/24; 713/188

(58) Field of Classification Search
USPC ............................................. 726/24; 713/188
See application file for complete search history.

(56) References Cited

U.S. PATENT DOCUMENTS

| | | | |
|---|---|---|---|
| 6,344,727 B1 * | 2/2002 | Desai et al. | 320/107 |
| 7,401,359 B2 | 7/2008 | Gartside et al. | |
| 2005/0127867 A1 | 6/2005 | Calhoon et al. | |
| 2005/0245245 A1 * | 11/2005 | Sorvari et al. | 455/418 |
| 2009/0217381 A1 * | 8/2009 | Helman et al. | 726/25 |
| 2010/0011442 A1 * | 1/2010 | Zhao | 726/24 |
| 2011/0197280 A1 * | 8/2011 | Young et al. | 726/24 |

OTHER PUBLICATIONS

International Search Report issued for PCT/US12/64109, dated Apr. 2, 2013 (3 pages).

* cited by examiner

*Primary Examiner* — Michael Pyzocha
(74) *Attorney, Agent, or Firm* — Wilmer Cutler Pickering Hale and Dorr LLP

(57) ABSTRACT

A system and method are described that will enable mobile smart devices, such as a cellular phones, PDAs, or iPads, smartphones, mobile payment systems, mobile healthcare systems, handheld law enforcement systems, and other types of tablet devices, to trust download applications and for the download applications to trust the mobile smart devices onto which they are downloaded. The system and method enables charging a mobile smart device and while charging the mobile smart device scans for malware and other viruses in the applications and the operating system on the mobile smart device.

31 Claims, 10 Drawing Sheets

SYSTEM AND METHOD FOR BIDIRECTIONAL TRUST BETWEEN DOWNLOADED APPLICATIONS AND MOBILE DEVICES INCLUDING A SECURE CHARGER AND MALWARE SCANNER

RELATED APPLICATIONS

The present application is an application claiming the benefit under 35 U.S.C. §119(e) of U.S. Provisional Patent Application Ser. No. 61/557,699, filed Nov. 9, 2011, U.S. Provisional Patent Application Ser. No. 61/567,320 filed Dec. 6, 2011, and U.S. Provisional Patent Application Ser. No. 61/570,585, filed Dec. 14, 2011, the disclosures of which are hereby expressly incorporated herein by reference in their entirety.

FIELD OF THE INVENTION

The present invention relates to systems and methods for enabling mobile devices to trust downloaded applications are authentic, enabling downloaded applications to trust the mobile device on which they are downloaded is authorized to download the applications, and enabling mobile device charging and while charging a mobile device scanning for malware and other viruses.

BACKGROUND OF THE INVENTION

Modern smart communications devices, such as cellular phones, personal digital assistants ("PDAs"), iPads® (a trademark of Apple Inc.), smartphones, mobile payment systems, e.g., point of sale systems (wired and wireless), mobile healthcare systems, handheld law enforcement systems, or other types of tablet devices (hereinafter, collectively, "mobile smart devices"), allow users to execute an entire range of commercial transactions, which requires users to enter required authentication credentials into the devices. Additionally, company and personal data can be repeatedly and permanently stored, and modified on these devices. Some organizations allow authorized mobile devices users to remotely access the entire corporate file structure.

Mobile smart devices are used by increasing numbers of children and minors. When used legitimately, these mobile smart devices can help a family communicate and manage complex schedules. As such, mobile smart devices provide an important safety link for children to enable them to call home in emergencies, etc.

Some of the most current mobile smart devices provide children and adults with access to nearly an unlimited variety of fun and/or developmental games. With regard to children, there are very real and well documented risks associated with mobile smart devices because children can be exploited by potential predators and other people who pose risks. These risks include, but are not limited to, children being given access to age inappropriate content, and more dangerously, through games or social networking services, means for luring them to provide personal data or enter into inappropriate communications. The ease of installing applications, the unlimited sources and supplies of applications, and the challenge of guaranteeing authenticity or legitimacy of applications make it nearly impossible to confidently contend that one's children are safely using their mobile smart devices.

When a mobile smart device downloads an application, that mobile smart device trusts the marketplace to verify the application does not include malware or other types of viruses. However, counterfeit versions of applications, such as counterfeit versions of the application "Angry Birds®" (a trademark of Rovio Mobile Oy Corporation), fail in this regard. As such, if a malware author creates a counterfeit group of applications, all of which include malware or other types of viruses, the damage to the devices, including mobile smart devices, on which they are downloaded, could be substantial.

Further, developers and publishers of applications that are downloaded to mobile smart devices have the expectation that the devices onto which their applications are downloaded are authorized mobile smart devices. If not, it provides an opportunity for attackers to impersonate an authorized mobile smart device to improperly obtain access to downloadable applications for unauthorized purposes.

The specific risks for mobile smart devices are both well documented and increasing. Mobile "botnets," pieces of malware running on mobile smart devices, facilitate the participation of these devices in illicit activities, such as stealing data and unwittingly participating in coordinated attacks, have been in existence since at least 2009. Exploits against Android™ (a trademark of Google Inc.), Windows Mobile® (a trademark of Microsoft Corporation), and iPhones® (a trademark of Apple Inc.) are published regularly. For the purposes of the present invention, an "exploit" is a piece of software, a chunk of data, or sequence of commands that takes advantage of a bug, glitch, or vulnerability in order to cause unintended or unanticipated behavior to occur on computer software, hardware, or something electronic (usually computerized). Exploits include, but are not limited to, things that will facilitate activities such as gaining control of a computer system or allowing privilege escalation, or a denial-of-service attack.

The mobile smart device industry has tended to mirror the desktop industry with regard to the compromise of mobile security devices. In this context, it is understood by mobile smart device users that their devices can be compromised and, in this light, what they want to know is how to detect when the device is compromised and how to significantly reduce the risk of compromise.

With the advent of the increased amount of confidential data and information being stored on mobile smart devices, there is a much greater risk of attackers seeking to surreptitiously gain access to these devices to obtain this information and data.

There are companies that have attempted to combat some of the security risks discussed above. One company, Lookout, Inc., has indicated it is developing a virus scanning application for mobile devices based on signature-based scanning. However, the personal computer market has proven the futility of the signature-based scanning approach. This approach has two basic problems.

The first problem is that the signature-based scanning approach relies on software interfaces to the applications and operating systems ("OS") receiving information about the data on the computer. However, it has become known that these types of dependencies can render the protection of applications useless. This is because if the attack program is sophisticated, such as those commonly referred to as "rootkits," they can subvert the OS itself and in turn "lie" to a virus scanner when they request potentially compromising information.

The second problem with the signature-based scanning approach is that it relies on cryptographic signatures of known malicious code in order to determine what to declare as a virus. The obvious problem with this approach is the system has no way of finding or quarantining malicious code that it has not already been told is malicious. As such, signature-based malware detection is generally believed to be incapable of keeping up with the development of malicious software, exploits, and emerging attack vectors.

Another company, Fixmo, Inc., has taken a software approach in the form of a desktop product that snapshots what is stored on a mobile device, e.g., a BlackBerry® (a trademark of Research in Motion Limited), and compares it with a previous snapshot. This approach, however, is not portable (mobile), is inconvenient, and is not designed for mass marketing.

From the point of view of carriers, e.g., AT&T Wireless and Verizon Wireless, the problems and risks discussed above drive up the real economic cost of customer support. Labor hours in retail stores and online are being spent to help customers troubleshoot their mobile smart devices. As mobile smart devices become even "smarter" and more complex, there will be a greater number of possible ways for something to go wrong with them. Currently, troubleshooting is a labor intensive proposition for carriers, it does not produce extra sales, and it takes away from employee time to generate sales.

Currently, there is not an easy and efficient way to scan a mobile smart device for malware and other viruses. The usual approach is to connect the mobile smart device to a laptop or desktop computer to perform such scans. Further, these scans must be carried out with the active participation of the computer user.

Typically, when a mobile smart device is being charged, it is usually dead time with respect to its user being able to use the device because it is tethered to a socket or computer by a charging cord. Further, mobile smart devices are almost totally unusable when they are being charged using a charging pad. This is why many people charge these devices at night or when they know they do not need to use them. It would be very advantageous to be able to use the charging time more efficiently and conduct malware and virus scans while the mobile smart device is being charged.

There is the need for a system and method that enables bidirectional trust between downloaded applications and the mobile smart devices onto which these applications are downloaded so that the mobile smart device can trust the downloaded applications are authentic and the downloaded applications can trust the mobile smart device is authorized to download them. There also is a need for an inexpensive mobile device that can be used for charging a mobile smart device and while charging scan and identify malware and other viruses that are on the mobile device.

SUMMARY OF THE INVENTION

The present invention is directed to a system and method that will enable users of mobile smart devices, such as cellular phones, PDAs, iPads, smartphones, mobile payment systems, e.g., point of sale systems (wired and wireless), mobile healthcare systems, handheld law enforcement systems, or other types of tablet devices, to trust download applications are authentic and for download applications to trust the mobile smart device onto which they are downloaded is authorized to download the applications. The system and method of the present invention are in part implemented through a secure charger that charges the mobile smart device and while charging it scans for malware and other viruses in the applications and the OS on the mobile smart device. This helps to troubleshoot the mobile smart device so it will operate properly.

The system and method of the present invention will validate the authenticity of applications that have been downloaded to a mobile smart device to prevent counterfeit applications from being used on mobile devices and infecting them. According to the present invention, when the secure charger scans for malware or other type of virus, it will access all the applications that have been downloaded to the mobile smart device. For mobile devices operating on an Android-based system, it will mean the present invention will access the application package ("APK") files of every application. Since each of the applications is signed, the mobile smart device can make assumptions regarding the identity of the entity that published the application. The present invention uses this information to verify that the signatures are not only valid but correspond to the appropriate application publisher, which permits verification of the authenticity of an application.

The system and method of the present invention creates a system database of applications, identifying information, and the appropriate application publishers. This information is stored at a remote location accessible through a remote system server. Preferably, application publishers will cooperate to facilitate the creation and population of this system database with publisher information. The system database also will be populated with popular applications in the marketplace, and the system administrator can verify the publisher information and add it to the database.

Typically, counterfeit applications do not have the appropriate publisher information associated with them. With the creation of the system database discussed above, when a downloaded application needs to be verified, the secure charger will send application information to the remote system server. The remote system server connects to the system database and the server will respond with the appropriate author's/publisher's public key for the secure charger to conduct the verification process. The secure charger will save the public keys which will enable the secure charger to carry out verifications itself in the future.

The system and method of the present invention permit applications to trust the mobile smart devices onto which they are downloaded is authorized to receive the downloaded application. Typically, when a mobile smart device uses an application accessible through a remote service, the application author/publisher and the service providing the application have to assume the mobile smart device is secure, i.e., it is a device authorized to receive the application download; however, there is currently no way to do this.

According to system and method of present invention, application authors/publishers and services that provide the applications for download can connect to the remote location to verify the mobile smart device is secure. This is accomplished by the secure charger reporting scan results to the remote server at the remote location every time it conducts a scan. The scan results will indicate the status of the mobile smart device as either compromised or not. The remote system server will store this information for logging and reporting, and to inform application authors/publishers and services whether the mobile smart device is secure.

The present invention provides a powerful capability for service writers because it gives them security guarantees and limits the ability of attackers to impersonate a mobile smart device. Although an attacker may attempt to impersonate a mobile smart device to test the defenses of the remote system server, the implementation of the present invention will enable the service to check to determine if the attacker is an authorized mobile smart device. If it is not, the mobile smart device will be viewed as "compromised" and not a trusted mobile smart device. Once a mobile smart device is determined to be "compromised" (or "not recently scanned"), the application author/publisher and/or service either will deny access to the application or take other punitive actions, such as issuing warnings, charging fees, or other types of actions to give notice that access is denied.

For purposes of the present invention, a "service" preferably is a "web service." The web service is an application that exists in a distributed environment, such as the Internet. The web service will effect communication between two electronic devices over the Internet. The web service will accept a request, perform the function based on the request, and return a response. The request and response may use a protocol, such as HTTP.

For purposes of the present invention, a "service writer" is a company or individual that provides the web service.

The secure charger according to present invention includes a mobile smart device charging cable and embedded electronics that will perform forensic and behavior analysis of the mobile smart device while it is charging. As such, system and method of the present invention will be able to observe malicious behavior, malicious software, modifications to the mobile smart device OS, and unwanted device communications. The secure charger will identify unusual patterns of device communications activities representing attempts to steal or redirect personal data on the device.

The system of the present invention resides outside of the mobile smart device system so it is able to interface with mobile smart devices at a very low level. As such, malware will not be able to "lie" to system of the present invention.

The scanning function that was described with respect to the secure charger may also be implemented by a separate wireless scanning device. The wireless device will include a hardware component and a software component. The wireless hardware component may use a radio frequency ("RF") connection including, but not limited to, an 802.11x or Bluetooth connection. The hardware component may be in the form of an 802.11x wireless access point ("WAP") or a Bluetooth dongle.

The software component located on the mobile smart device acts as a proxy for an authenticated hardware device to perform analysis and run scans. Authentication is achieved by having the hardware component present a signed certificate and the software component will validate the signature.

The system and method of the present invention provide a means by which a mobile smart device can trust a downloaded application.

The system and method of the present invention provides a means by which a downloaded application can trust that the mobile smart device on which it is downloaded is authorized to download the application.

The system and method of the present invention provides means by which a single device can charge a mobile smart device and also scan the mobile device for malware or other viruses while mobile smart device is charging.

The system and method of the present invention also provide means by which a separate scanning device can be used to wirelessly scan a mobile smart device for malware and other viruses.

The system and method of the present invention will be described in greater detail in the remainder of the specification referring to the drawings.

DETAILED DESCRIPTION OF THE DRAWINGS

The present invention is directed to a system and method that enables mobile smart devices, such as cellular phones, PDAs, iPads, smartphones, mobile payment systems, e.g., point of sale systems (wired and wireless), mobile healthcare systems, handheld law enforcement systems, or other types of tablet devices, to trust download applications and for the download applications to trust the mobile smart device onto which they are downloaded. The system and method of the present invention are implemented in part through a secure charger that charges the mobile smart device and while charging, performs forensic and behavior analysis of the mobile smart device. This helps troubleshoot the mobile smart device so it will operate properly. The forensic and behavior analysis that is performed includes, but is not limited to, scanning to identify malicious behavior within the mobile smart device, malicious software within the mobile smart device, modifications to the OS of the mobile smart device, and unwanted mobile smart device communications.

Figure 1:
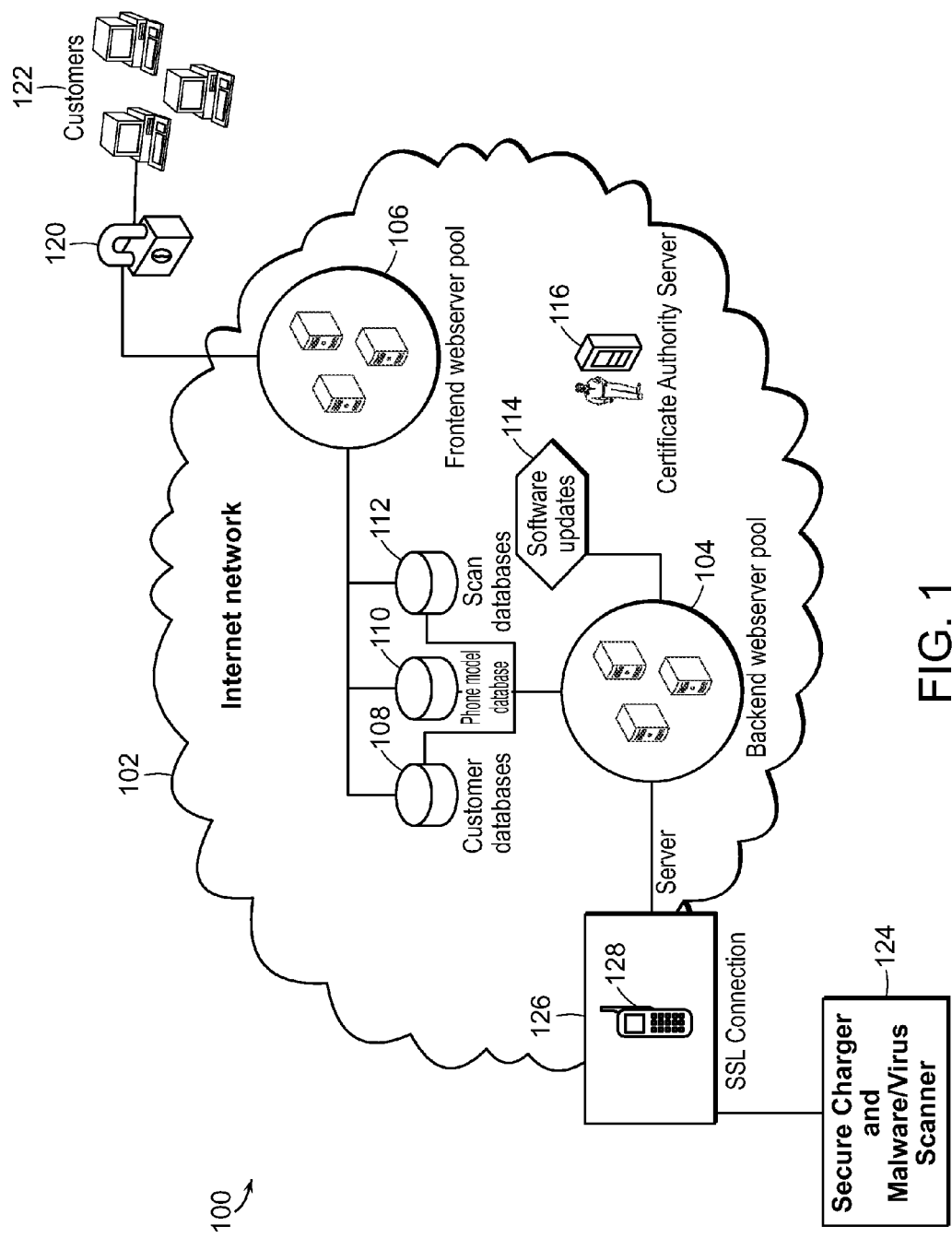
FIG. 1 shows a representative drawing of the system of the present invention for implementing bidirectional trust between a mobile smart device and downloaded applications.

FIG. 1, generally at 100, shows a representative diagram of the system of the present invention for implementing bidirectional trust between a mobile smart device and downloaded applications. FIG. 1 also shows the secure charger and malware/virus scanner (hereinafter "secure charger") that is used in part for implementing bidirectional trust between a mobile smart device and downloaded applications, besides charging the mobile smart device and conducting malware and virus scans. The overall system shown in FIG. 1 will now be generally described.

Internal network 102 is a remote network to which secure charger 124 connects through SSL connection 126 that includes mobile smart device 128. Internal network 102 includes backend web server pool 104 (hereinafter "backend server 104"), software update mechanism 114 for providing updates to secure charger 124, customer database 108, mobile smart device model database 110 (MSD database 110"), scan database 112, certificate authority server 116, and frontend web server pool (hereinafter "frontend server 106"). Customers 122 connect to frontend server 106 via authentication mechanism 120, which operates conventionally. Backend server 104 and frontend server 106 collectively may be referred to herein as the "remote server" and still be within the scope of the present invention. Moreover, the functionality of backend server 104 and frontend server 106 may be combined into a single server and it will still be within the scope of the present invention. FIG. 1 will now be described in greater detail.

Secure charger 124, which will be described in detail subsequently with regard to its internal components and its method of scanning the mobile smart device for malware and viruses, uses the Internet connectivity of mobile smart device 128 to connect to backend server 104 of internal network 102. This communications link is for secure charger 124 to report scans results to internal network 102, and query internal network 102 for baselines and settings, and to receive software updates and other information from internal network 102.

Secure charger 124 reports the results of malware and virus scans to internal network 102. Preferably, these scans will include non-private analysis data or statistics and analysis, for example, relating to a version of an operating system, installed applications, carriers, etc. When secure charger 124 scans mobile smart device 128 and the secure charger has no baseline for that mobile smart device or there has been a change to the mobile smart device's baseline, e.g., the mobile smart device had a software update, then secure charger 124 will query backend server 104 for a new baseline and that baseline will be retrieved from MSD database 110. The use of the baseline by the secure charger in scanning a mobile smart device will be described subsequently.

Internal network 102, preferably, includes three databases. These are customer database 108, MSD database 110, and scan database 112. Customer database 108 is for storing customer information. This customer information associates a particular mobile smart device with a particular system user. Customer database 108 also is for storing customer settings, such as, (i) if a customer wants to be alerted by email when new scan results are received or (ii) the customer's risk profile.

MSD database 110 stores information on all mobile smart device models supported by internal network 102. MSD database 110 stores for each mobile smart device model it supports the software versions, baselines, and miscellaneous analysis information, e.g., recovery images. MSD database is queried by secure charger 124 for information to do scan analysis. It is understood that there may be one or a plurality of mobile smart device models supported by internal network 102 and still be within the scope of the present invention.

Scan database 112 is for storing scan results received from secure charger 124. These results include, but are not limited to, whether the mobile smart device is "compromised" (meaning that it contains malware or a virus), the list of applications on the mobile smart device, the list of files and hashes on the mobile smart device, the date and time of scans, and the types of scans. Scan database 112 also stores information relating to applications that are on the mobile smart device. This information includes, but is not limited to, the application author/publisher information and IMEI information relating to mobile smart device 128, as will be explained in detail subsequently.

When there are updates for secure charger 124, they are communicated from software update mechanism 114 to secure charger 124 via backend server 104 and the SSL connection 126. The communications in SSL connection 126 is effected through the Internet connectivity of mobile smart device 128.

SSL connection 126 is used to guarantee the validity of the communications from secure charger 124 to internal network 102. Each secure charger has a client certificate/key pair and certificate authority certificate for effecting secure communications between secure charger 124 and internal network 102. Therefore, when secure charger 124 communicates with backend server 104 using the Internet connectivity of mobile smart device 128, certificate information is sent to backend server 104. Backend server 104 has a copy of the predetermined certificate authority certificate from certificate authority server 116 that is used to verify that the certificate information from secure charger 124 is signed by the predetermined certificate authority private key. If correctly signed, then the communications is valid and acted upon by internal network 102.

Customers 122, for example, are information technology ("IT") administrators at the enterprise and governmental level, retail consumers, and carrier customer service representatives. In order for customers 122 to communicate with internal network 102, they must have the right permissions to access internal network 102 through authentication mechanism 120. Further, application publishers and authors communicate with internal network 102 through authentication mechanism 120 and frontend server 106, described in detail subsequently with regard to FIGS. 3 and 4.

Figure 2:
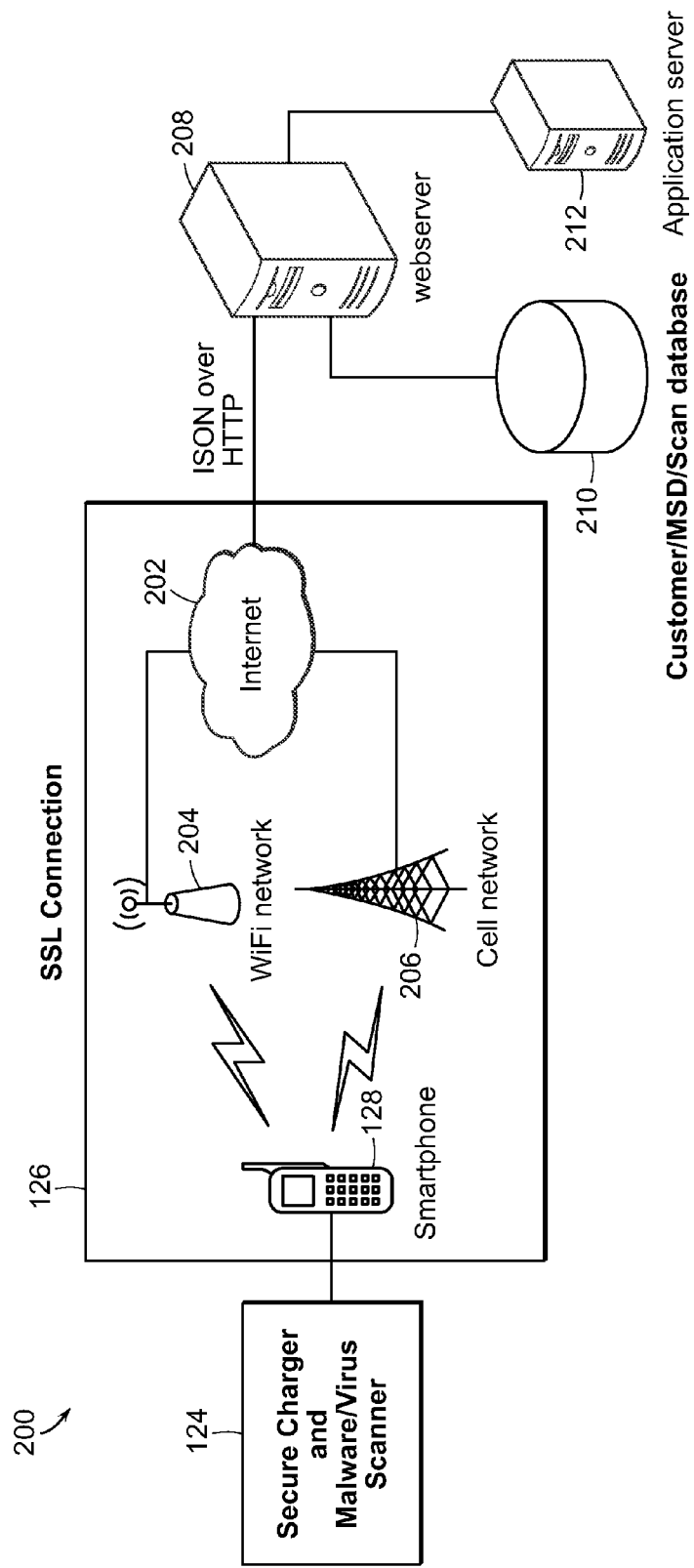
FIG. 2 shows a representative drawing of the secure sockets layer ("SSL") connection shown in FIG. 1.

Referring to FIG. 2, generally at 200, SSL connection 126 is shown in greater detail. As shown, secure charger 124 connects to mobile smart device 128 that is part of SSL connection 126 for purposes of connecting to internal network 102 (see FIG. 1). Mobile smart device 128 connects to Internet 202 by either Wi-Fi network 204 or cell network 206. The format for the communications from secure charger 124 through SSL connection 126 to remote server 208 is preferably JSON ("JavaScript Object Notation") over HTTP. As shown, database 210 connects to remote server 208. Database 210 represents the collective databases shown in FIG. 1, namely, customer database 108, MSD database 110, and scan database 112. Further, application server 212 processes requests and performs any necessary actions based on the requests, such as send an email to an administrator, and, preferably, the functionality of application server 212 is part of webserver 208.

Before discussing bidirectional trust between mobile smart device 124 and downloaded applications, secure charger 124 will be discussed in detail because an understanding of secure charger 124 is necessary to fully understand the method for bidirectional trust between a mobile smart device and downloaded applications.

Figures 5A, 5B:
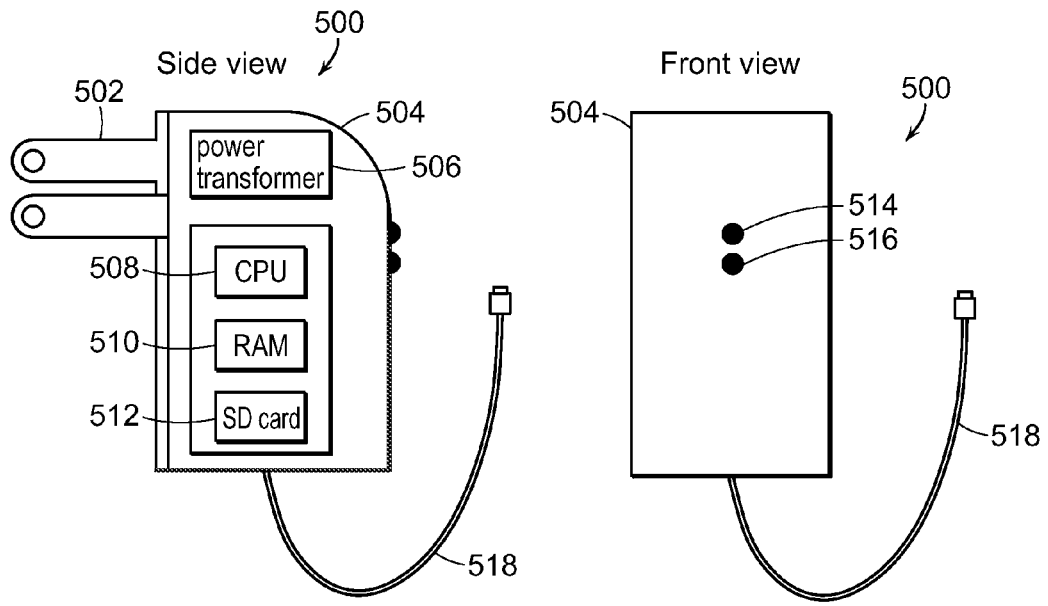
FIGS. 5A and 5B show a side view and a front view, respectively, of a first embodiment of the secure charger for connection to a mobile smart device for charging the device and conducting malware and other virus scans of the applications and OS on the mobile smart device.

FIGS. 5A and 5B show a side view and a front view, respectively, of a first embodiment of the secure charger for connection to a mobile smart device. The secure charger has the capability of conducting malware and other virus scans of the applications and OS of the mobile smart device while it is charging the device.

Referring to FIG. 5A, generally at 500, a side view of the exposed interior of the secure charger according to the present invention is shown. In FIG. 5A, electrical prongs 502 are shown for connecting the secure charger to a wall socket. However, it is understood that the prongs could be replaced with other means for connecting the secure charger to a power source. For example, secure charger 500 could have a cable extending from it that has a USB or USB 2 plug at the end for connection to a power source. These and other similar connection methods are contemplated by the present invention and, therefore, are within the scope of the present invention.

Again referring to FIG. 5A, within housing 504 of secure charger 500 is a power transformer 506 for converting AC power to DC power. Secure charger 500 also includes CPU 508, random access memory ("RAM") 510, and secure digital ("SD") card 512. CPU 508 is for controlling all of the operations of secure charger 500. RAM 510 serves as system memory and stores the running program code and data, as well as volatile system files, e.g., logs. SD card 512 is for storing the OS, security analysis programs, and the on-device database. Security analysis programs include, but not limited to, software programs that are included in secure charger 500 or available for download from internal network 102 that perform the various analyses of the mobile smart device as described herein. It is understood that additional security analysis programs may be added and it will still be within the scope of the present invention.

Cable 518 that extends from housing 504 has a connector at the end for connecting to a mobile smart device. It is through this cable that (1) charging is performed and (2) scans of mobile smart devices are carried out and information is transmitted to, and received from, backend server 104.

Referring to FIG. 5B, which shows a front view of housing 504, has red light emitting diode ("LED") 514 and green LED 516. When illuminated, red LED 514 may indicate the results of a scan of the applications or OS on the mobile smart device or show that the device is "compromised." When green LED 516 is illuminated, it may indicate the results of a scan of applications or OS on the mobile smart device or show that the device is "not compromised." The use of the indicator lights will be described in detail subsequently.

Preferably, secure charger 500 includes one or more status lights for the purposes of indicating the status of the mobile smart device: charging and scanning. For example, secure charger 500 may have a LED that is red or blinking while the mobile smart device is charging and then illuminate green LED or a steady red LED, respectively, once charging is complete. Secure charger 500 also may have a red LED to indicate scanning status and results. For example, the red LED may be blinking to indicate a scan is in progress, turn steady if the scan determines the mobile smart device is "compromised," and turn off or illuminate a green LED if either the scan indicates the mobile smart device is safe and "not compromised," or that the mobile smart device has been disconnected from secure charger 500. These are just a few possibilities but others are contemplated and are considered within the scope of the present invention.

Figures 6A, 6B:
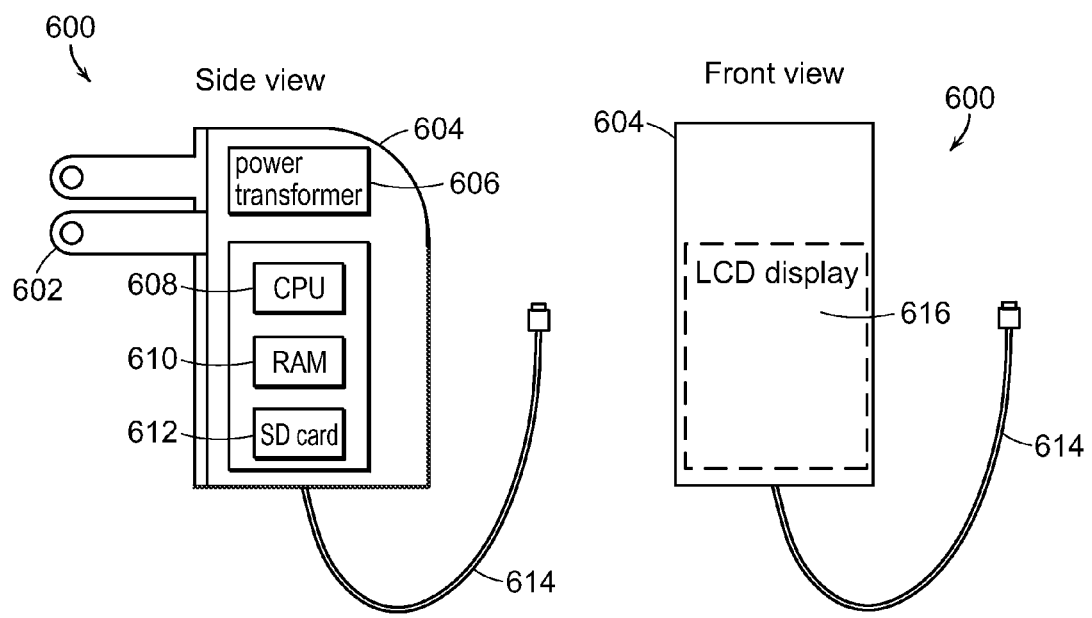
FIGS. 6A and 6B show a side view and front view, respectively, of a second embodiment of the secure charger for connection to a mobile smart device for charging the device and conducting malware and other virus scans of the applications and OS on the mobile smart device.

FIGS. 6A and 6B show a side view and front view, respectively, of a second embodiment of the secure charger for connection to a mobile smart device. The secure charger has the capability to conduct malware and other virus scans of the applications and OS while it is charging the device.

Referring to FIG. 6A, generally at 600, a side view of the exposed interior of the secure charger is shown. In FIG. 6A, electrical prongs 602 are shown for the connection to a wall socket. However, it is understood that the prongs could be replaced with other means for connecting to a power source. For example, secure charger 600 may have a cable extending from it that has a USB or USB 2 plug at the end for connection to a power source. These and other similar connection methods are contemplated by the present invention and they are within the scope of the present invention.

Referring to FIG. 6A, within housing 604 of secure charger 600 is a power transformer 606 for converting AC power to DC power. Secure charger 600 also includes CPU 608, RAM 610, and SD card 612. CPU 608 is for controlling all of the operation of secure charger 600. RAM 610 serves has system memory and stores the running program code and data, as well as volatile system files, e.g., logs. SD card 612 is for storing the OS, security analysis programs, and the on-device database. Security analysis programs include those as set forth with respect to SD card 512 in FIG. 5.

Cable 614, which extends from housing 604, has a connector at the end for connecting to a mobile smart device. It is through this cable that (1) charging is performed and (2) scans of mobile smart devices are carried out and information is transmitted to, and received from, backend server 104.

Referring to FIG. 6B, which shows a front view of housing 604, shows liquid crystal display ("LCD") 616. LCD 616 will show the results of scans, which include whether the applications or OS on the mobile smart device are "compromised" or "not compromised."

Figure 7:
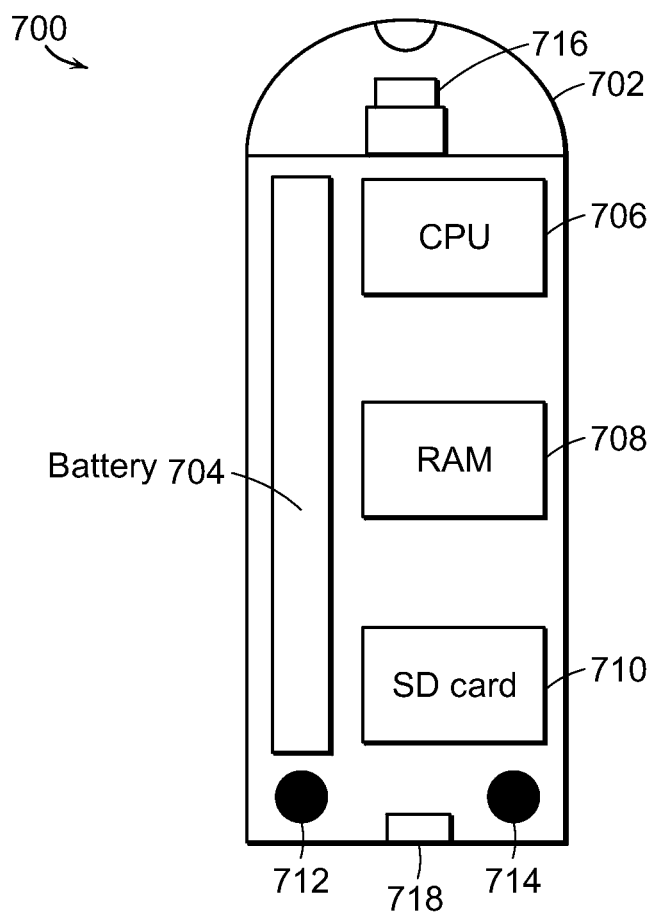
FIG. 7 shows a representative top view of a standalone embodiment of a device for wirelessly conducting malware and other virus scans of the applications and OS on a mobile smart device.

Referring to FIG. 7, generally at 700, a top exposed view of a standalone embodiment of a scanning device for wirelessly connecting to a mobile smart device is shown. This wireless embodiment can be used for conducting malware and other virus scans of applications and the OS on a mobile smart device. Within housing 702 is a battery 704, CPU 706, RAM 708, and SD card 710. Green LED 712 and red LED 714 also are shown for indicating scanning status and/or scanning results.

Battery 704 is for powering a scanner device 700 in lieu of the scanner device being connected to a wall socket. However, it is also contemplated that wireless scanner device 700 may connect to an external power source using USB port 718. Further, it is contemplated that battery 704 is a rechargeable battery. As such, the rechargeable battery may be charged through USB port 718 by any of a number of conventional methods, and sources include recharging the scanner device battery from a computer using USB port 718.

The CPU, RAM, and SD card, carry out substantially the same functions as described for the embodiments shown in FIGS. 5A and 5B. As such, those descriptions are incorporated herein by reference. This wireless embodiment, also includes transceiver 716 for bidirectional communications with mobile secure device 128 (FIG. 1) for conducting scans and also for bidirectional communications with internal network 102 using the Internet connectivity of mobile secure device 128 (FIG. 1). It is understood that scanning device 700 may use methods other than green LED 712 and red LED 714 to indicate the status of scans and scan results, and it still will be within the scope of the present invention.

A wireless scanner device, such as that shown in FIG. 7 at 700, preferably, includes scanner devices that will wirelessly connect to mobile smart device 128 (FIG. 1) using 802.11x or Bluetooth. The embodiments according to the wireless RF communication method include an 802.11x wireless access point ("WAP") and a Bluetooth dongle. According to the 802.11x embodiment, the mobile smart device connects to the WAP and then informs the WAP using TCP/IP that it wants to be scanned. Preferably, the WAP embodiment provides a channel on which the WAP can run native commands on mobile smart device 128, download files, reboot into recovery, and conduct other analysis. Since a WAP would have its own Internet connectivity, it would use this connectivity to connect to internal network 102 rather than connecting through mobile smart device 128.

The Bluetooth embodiment, preferably in the form of a Bluetooth dongle, provides the same features as the WAP but in a portable form factor (e.g., on a key chain). Mobile smart device 128 pairs with the dongle and informs the dongle it desires to be scanned. According to the Bluetooth embodiment, the mobile smart device provides the same type of control channel as in the WAP embodiment; however, the Bluetooth embodiment will connect to internal network 102 using the Internet connectivity of mobile secure device 128. For power, the Bluetooth embodiment contains a battery and/or can be connected to an external power source, e.g., plug into a wall socket or connect to a laptop via a USB connection.

Again referring to FIG. 1, as previously stated, secure charger 124, preferably is embodied in a hardware device that includes operating software that serves a dual purpose: (1) to charge the connected mobile smart device 128, as well as, (2) verify the integrity of the connected mobile smart device 128, which includes, for example, verifying the mobile smart device contains no "rootkits," which is a form of malware, checking for counterfeit applications, and looking for high risk applications.

When secure charger 124 is connected to mobile smart device 128, it will conduct a series of scans. The two principal types of scans are "full scans" and "quick scans." A quick scan, which will be described in detail subsequently, is run as soon as mobile smart device 128 is connected to secure charger 124. Preferably, a quick scan will take approximately 60 seconds to run. A full scan, which also will be described in detail subsequently, is run approximately one hour after the quick scan has been run. However, the mobile smart device user may choose to run the full scan more or less than one hour after a quick scan and it will still be within the scope of the present invention.

A quick scan includes, but is not limited to, performing runtime analysis and metadata analysis. The runtime analysis includes, but is not limited to, verifying invariants to detect changes. For example, if there is a list of running processes, the new ones running as a root would be an "invariant." Another example of invariants is the flags on mount points because some mount points should be setuid ("set user ID upon execution"), some should be read-write, but none should be both setuid and read-write. However, it is understood that runtime analysis may be directed to other than invariants and it will still be within the scope of the present invention.

The metadata analysis creates a list that includes all the accessible files on mobile smart device 128 along with their properties, including but not limited to: size, type, time modified, owner, and group. Once this is done, the metadata comparison method relies on a baseline to compare against the list. The baseline is either the last "not compromised" scan or, if this is a first scan or the baseline does not match the list, a baseline that is queried from the backend server and retrieved from phone database 110. The baseline stored in phone database 110 would be the initial mobile smart phone device OS, applications, and files that were on the mobile smart device as received from the manufacturer. If a file has been introduced to mobile secure device 128, the secure charger 124 will detect it and flag secure mobile device 124 as potentially "compromised."

A full time scan will take approximately 10 minutes to run. A full time scan will include each of the scans that is conducted during the quick scan plus the following additional analysis scans: filesystem analysis, signature detection, application analysis, and reboot into boot image analysis.

The filesystem analysis contemplated by the present invention includes downloading to secure charger 124 every file to which it has access when connected to mobile smart device 128, hashing each of these files, and comparing the hashes against hashes from a previous scan. The files and hashes from the last "not compromised" scan that are stored on secure charger 124 are used as the baseline. If this is the first scan, or if a scan indicates a "compromise," secure charger 124 device queries that backend server 104 for a baseline which is retrieved from phone database 110. Once a baseline is established, secure charger 124 can detect if malware has modified any system files. In this manner, secure charger 124 can verify mobile smart device 128 even if it has been updated to a new version.

Signature detection analysis is useful for detecting old malware and exploits. Signature detection analysis is done on both the system files and applications including files inside applications. Signature detection analysis is carried out because of observed malware using public exploits for privilege escalation, which can be detected with proper signatures. According to the present invention, a database of signatures is maintained on secure charger 124 for this purpose and this database is preferably updated daily from communications with internal network 102. The signatures are maintained in a relational database, such as SQLite available from Hipp, Wyrick & Company.

In order for secure charger 124 to be the most effective in preventing attacks onto the mobile smart device OS and applications, it should not only scan for malware and exploits but it should also be able to provide patches to the OS and application running on mobile smart device 128 that can prevent such malware and exploits from accessing the OS or applications. Accordingly, it is contemplated that when patches for discovered vulnerabilities are developed by internal network 102, these patches can be downloaded from a backend server 102 to secure charger 124 through the Internet connectivity of mobile smart device 128. These patches then may be uploaded to, and implemented in, the OS and applications of mobile smart device 128 at runtime or according to another procedure, which includes a vulnerable file replacement procedure. It also is contemplated that the patches may be uploaded to, and implemented in, the OS and applications of mobile smart device 128 by authorized third-party systems that maintain a proprietary communications link with internal network 102 for the purpose of acting as a proxy for secure charger 124 for providing patches. However, preferably, the uploading of the patches will be done through secure charger 124.

Application analysis is carried out as part of the scan by listing and downloading all the applications on mobile smart device 128. This scan will inspect the applications and look for suspicious behavior. For example, if a piece of malware tries to disguise some of its files as images by changing the extension, it would be detected because that file type would not match its extension. This scan also will detect counterfeit applications by checking if the name of the application is in the database of applications for mobile smart device 128, and if it is, whether it is signed by the correct author. Further, the scan will check application permissions for high risk combinations, such as read SMS+access Internet, or permissions that facilitate exploits.

Reboot into boot image analysis is based on the use of a custom boot image. According to this analysis, secure charger 124 will reboot mobile smart device 128 into a boot image that is uploaded over USB to boot loader, so if the OS is "compromised," it cannot lie to secure charger 124 because the compromised OS is not running and cannot affect the scan. The reboot process may be carried out without human intervention.

Preferably, the custom image can be incorporated in the recovery partition of mobile smart device 124. Once in the recovery image, the boot image analysis will permit comparing a wider range of files. However, whether or not the custom image is in the recovery image, the reboot into boot image analysis will be carried out.

It is understood that the secure charger may be configured such that a quick scan may include more or less than the two previously disclosed scans and the scans may be different from those disclosed and still be within the scope of the present invention. Likewise, a full scan may include more or less than the six previously disclosed scans and the scans may be different from those disclosed and still be within the scope of the present invention.

If the results of the scans indicate that there are identified "compromises," the following actions may be taken: the user is alerted via LED lights (see FIGS. 5A and 5B), LCD (see FIGS. 6A and 6B), SMS, and/or email, the mobile smart device disconnected from the enterprise network, or restore the mobile smart device to a previous state. It is understood that other methods of notification of "compromises" may be used and still be within the scope of the present invention.

Once the scans are completed by secure charger 124 or wireless scanning device 700 (FIG. 7) (hereinafter, collectively ("secure charger 124"), and the appropriate action is taken, secure charger 124 reports the scan results to internal network 102.

A backend server 104 includes a monitor (not shown) accessible by the network administrator so that an administrator may monitor the system for problems, and perform investigations into identified problems. For example, the problems include, but are not limited to, infections, applications that violate policy, rooted mobile smart devices, and missing mobile smart devices. If mobile smart device 128 is charged, at this point, the mobile smart device user can unplug it from secure charger 124 with the assurance that the mobile smart device user does not contain a persistent backdoor, unless secure charger 124 has indicated otherwise.

The results of the scans are reported to backend server 104 where they are stored in scan database 112 (see FIG. 1). Reporting results to internal network 102 allows the mobile smart device user and system administrators to manage mobile smart device(s) and view reports, respectively. The mobile smart device user may access this information through authentication mechanism 120 as a customer 122 (FIG. 1).

Now, the method of conducting quick and full scans, and reporting scan results will be described referring to FIGS. 8-12.

Figure 8:
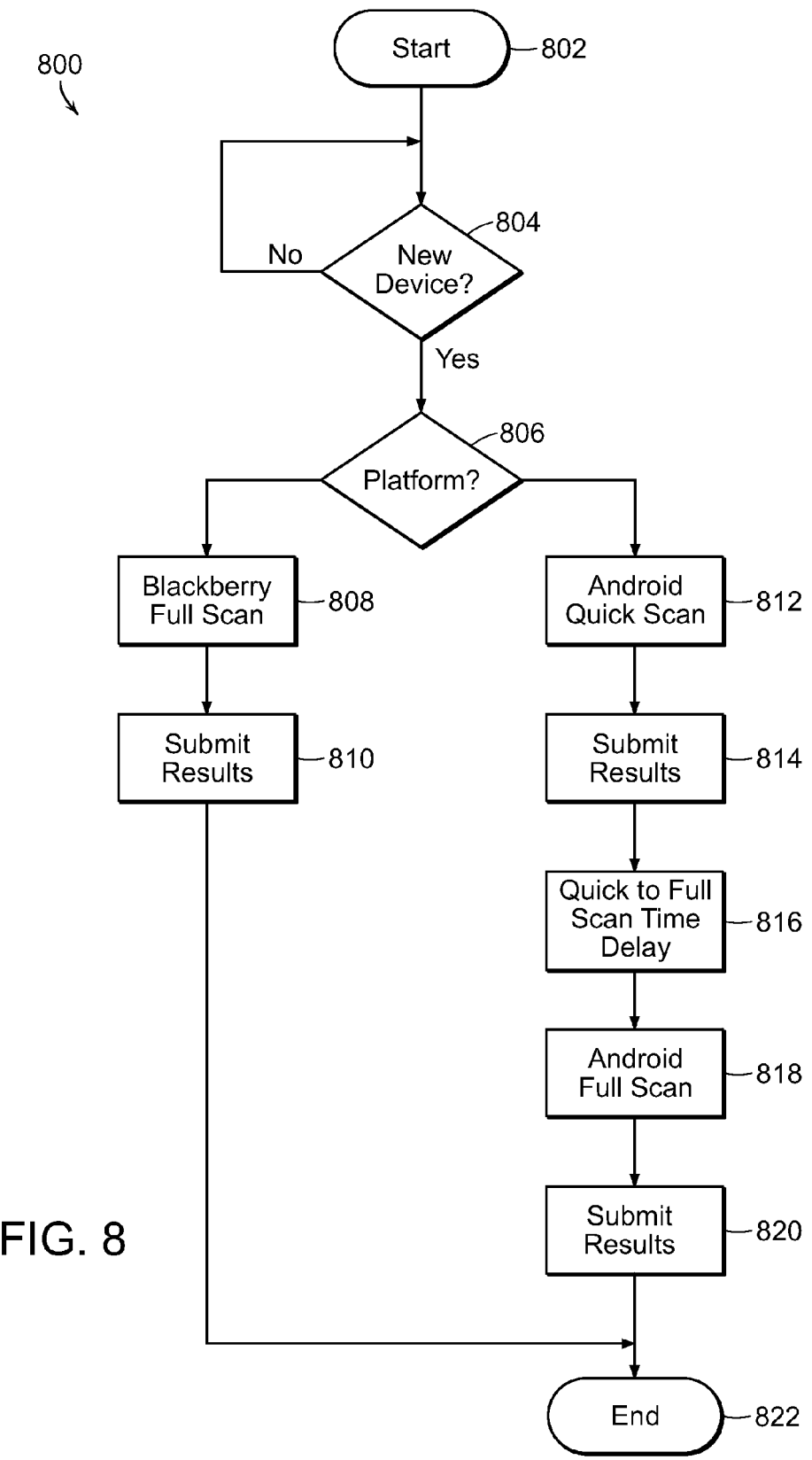
FIG. 8 shows a representative flow diagram for conducting malware and other virus scans on representative devices, such as BlackBerry-based systems and Android-based systems.

Referring to FIG. 8, generally at 800, a representative flow diagram is shown for conducting malware and other virus scans on representative devices, such as BlackBerry-based systems and Android-based systems. Although FIGS. 8-12 are discussed with respect to Blackberry-based systems and Android-based systems, it is understood that the present invention equally applies to other mobile smart device systems, smartphones, mobile payment systems, e.g., point of sale systems (wired and wireless), mobile healthcare systems, handheld law enforcement systems, or other types of tablet devices, and such other systems are within the scope of the present invention.

Again referring to FIG. 8, step 802 is commenced once a wired or wireless connection has been established between secure charger 124 and mobile smart device 128. At step 804, secure charger 124 checks to see if the mobile smart device is "new." By new, it is meant that at step 802, when secure charger 124 is plugged into a power source, e.g., an electrical wall socket, at step 804, secure charger 124 checks to determine if a mobile smart device is connected to it. The loop ends once a mobile smart device is connected to secure charger 124, or secure charger 124 is unplugged from the power source.

If the mobile smart device is new, then the process proceeds to step 806 to determine the platform of the mobile smart device. If it is a BlackBerry-based device, then the method proceeds to step 808 where a scan is conducted according to FIG. 9. As is shown, there is only a full scan for the Blackberry-based system; however, it is understood a quick scan may also be conducted with regard to Blackberry-based systems and it will still be within the scope of the present invention.

Figure 9:
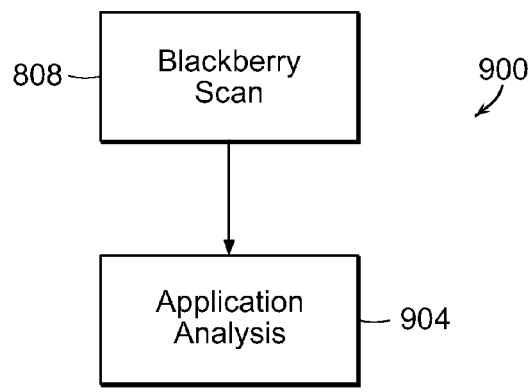
FIGS. 9 show a representative flow diagram for conducting full malware and other virus scans on Blackberry-based systems.

FIG. 9, generally at step 900, shows a representative flow diagram for conducting a full malware and other virus scan on a Blackberry-based system. As shown at step 904, secure charger 124 conducts an application analysis scan of mobile smart device 128. The scan includes, but is not limited to, checking to determine if new applications have been added to the mobile smart device, if any applications have changed, e.g., a new version, a different author, and checking for suspicious behavior.

Returning to FIG. 8 at step 810, the scan results are submitted to backend server 104 and the results are stored in scan database 112.

Figure 10:
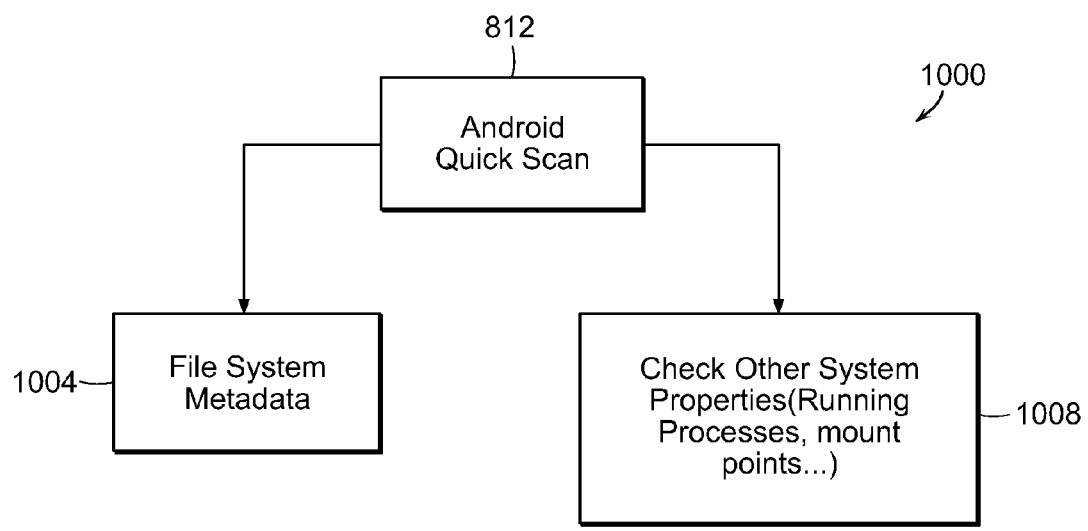
FIG. 10 shows a representative flow diagram for conducting quick malware and other virus scans on Android-based systems.

Again referring to FIG. 8, at step 812, an Android-based system quick scan is conducted according to FIG. 10. FIG. 10 shows a representative flow diagram for conducting a quick malware and other virus scan on Android-based systems.

Referring to FIG. 10, generally at step 1000, two scans are shown. The first scan is the metadata scan at step 1004 and the second is to check for other system properties, such as running processes, mount points, etc. at step 1008. These scans have been described previously.

Returning to FIG. 8 at step 814, the results of the quick scan are submitted to backend server 104 and the scan results are then stored in scan database 112.

At step 816, there is a time delay between when the quick scan is run and a full scan is run. This time interval is determinable by the system user. However, preferably, the time interval is approximately one hour.

Figure 11:
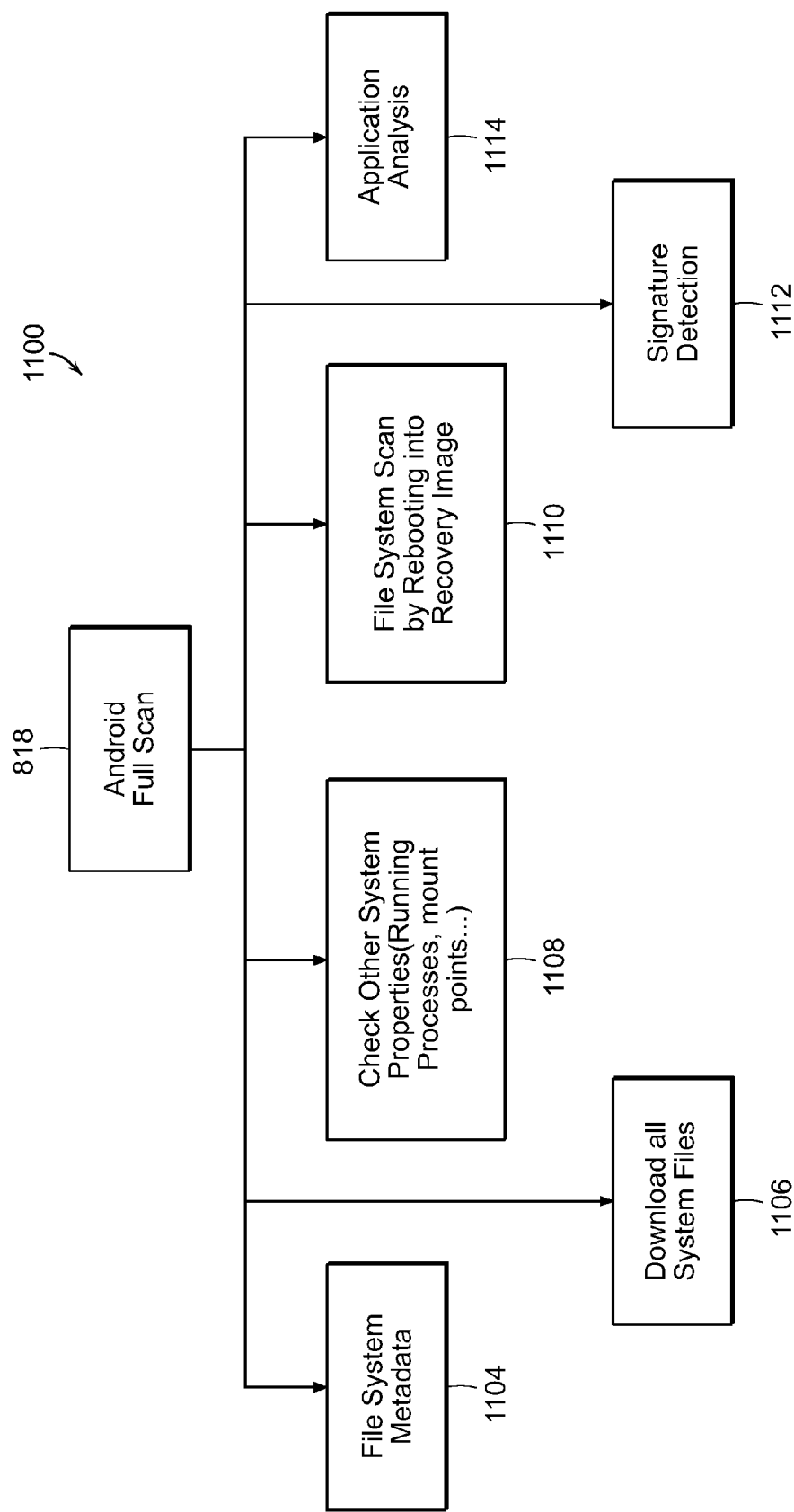
FIG. 11 shows a representative flow diagram for conducting full malware and other virus scans on Android-based systems.

At step 818, a full scan is conducted according to FIG. 11. FIG. 11 shows a representative flow diagram for conducting full malware and other virus scans on Android-based systems.

Referring to FIG. 11, generally, at step 1100, there are six types of scans conducted. The first two scans, the metadata scan at step 1104 and the other system property scan at step 1108, are the same scans that were run during the quick scan. The third scan at step 1106 is a system file scan. The fourth scan at step 1110 is a file system scan by rebooting into a recovery image. The fifth scan at 1112 is a signature detection scan. The sixth scan at 1114 is an application analysis scan.

Returning to FIG. 8, at step 820, the results of the full scan are submitted to backend server 104 and the results are stored in scan database 112.

Referring to FIG. 8 at step 810, step 814, and step 820, it indicates the results of scans are submitted to internal network 102 through backend server 104 so that they may be stored in scan database 112. The process of submitting the scan results to internal network 102 is carried out according to the process shown in FIG. 12. More specifically, FIG. 12 shows a representative flow diagram for processing "submit results" associated with conducting malware and other virus scans on Blackberry-based systems and Android-based systems.

Figure 12:
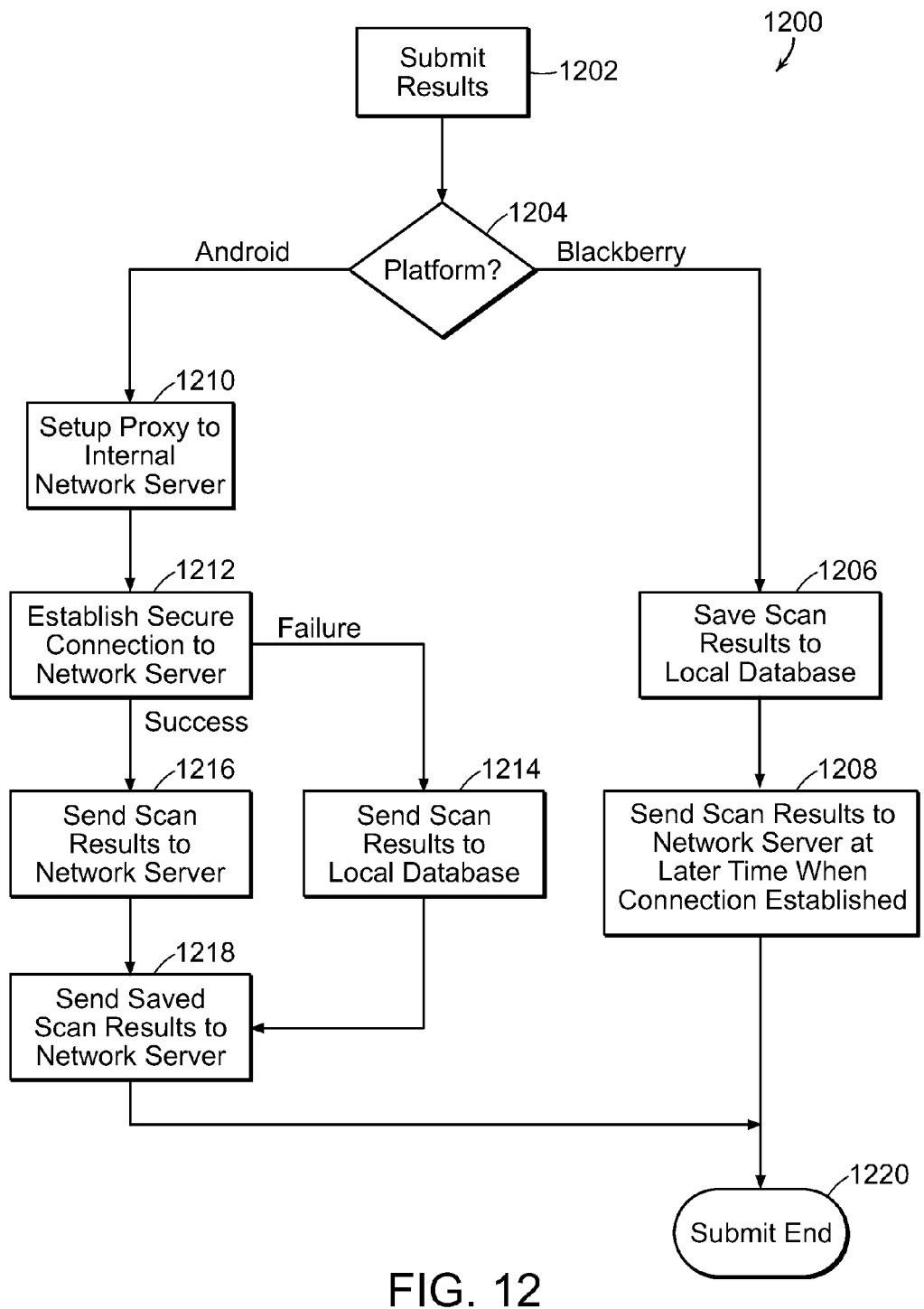
FIG. 12 shows a representative flow diagram for processing "submit results" associated with conducting malware and other virus scans on representative devices, such as Blackberry-based systems and Android-based systems.

Referring to FIG. 12, reference number 1202 is directed to submit results at step 810, step 814, and step 820 in FIG. 8. When scan results are to be submitted to backend server 104 for storage in scan database 112, the process proceeds to step 1204 where it is determined whether the platform is a BlackBerry-based system or an Android-based system. If it is a BlackBerry-based system, then the process proceeds to step 1206 where the results are saved in a local database on secure charger 124 (FIG. 1). After this, the process proceeds to step 1208 where the scan results are sent to backend server 104 at a later time when secure charger 124 establishes a connection with the backend server 104 through the Internet connectivity of mobile smart device 128. The scan results that are received by the backend server 104 will be stored in scan database 112. After this, the process moves to "submit end" at step 1220.

If at step 1204, it is determined that the platform is an Android-based system, the process proceeds to step 1210. At step 1210, secure charger 124 sets up a proxy with backend server 104 using the Internet connectivity of mobile smart device 128. Once this proxy is set up, secure charger 124 will attempt to establish a secure connection with backend server 104 at step 1212. If the connection is a failure at step 1212, the process will proceed to step 1214 where the scan results are saved in the local database in secure charger 124. If, however, the secure connection is successful at step 1212, the process proceeds to step 1216 where the scan results are sent to backend server 104. Next, the process proceeds to step 1218 where all the saved results of previous scans from step 1214 are transmitted to backend server 104, and the process will proceed to step 1220 which ends the scan submit process.

Figure 3:
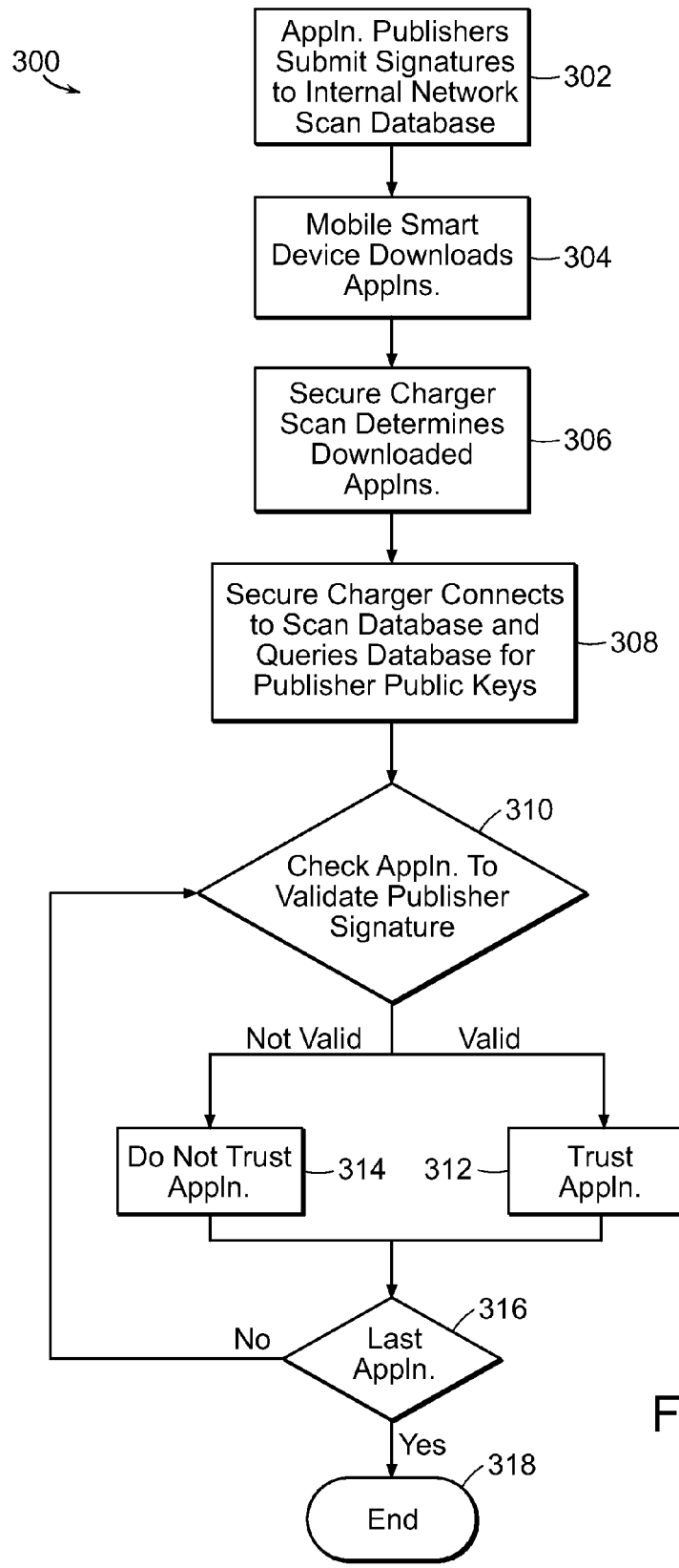
FIG. 3 shows a representative flow diagram for determining whether a downloaded application can be trusted by the mobile smart device on which it is downloaded.

Now that secure charger 124 of the present invention has been described, the bidirectional trust between downloaded applications and mobile smart devices will now be described referring to FIGS. 3 and 4.

As stated previously, preferably, the system and method of the present invention will validate the authenticity of applications that have been downloaded to mobile smart devices to prevent counterfeit applications from being used on these mobile smart devices and infecting them. Accordingly, when secure charger 124 conducts at least full scans of mobile smart device 128 for malware or other type of virus, it will access all the applications that have been downloaded to mobile smart device 128. For mobile smart devices operating on an Android-based OS, it will mean the present invention will have access to the application package ("APK") files of every application. Each of the applications is signed so mobile smart device 128 can make reasoned assumptions about the identity of the entity that published the application. This information is used to verify that the signatures are not only valid but correspond to the appropriate publisher.

According to the present invention, a portion of scan database 112 is segmented for storing information about applications downloaded to mobile smart device 128 and the authors/publishers of the applications. This is accomplished by secure charger 124 scanning mobile smart device 128 and downloading information relating to all of the applications thereon. This information will be sent to backend server 104 and associated with the appropriate author/publisher information stored in the segmented portion of scan database 112. Preferably, appropriate authors/publishers will cooperate to facilitate populating the scan database with the author/publisher information. The scan database also will be populated with popular applications that are in the marketplace and the publisher data that is available. The system administrator will verify the publisher information for these types of applications and add it to the database. It is understood the "author/publisher" information may be separate "author" or "publisher" information, or both "author" and "publisher" information and still be within the scope of the present invention.

The reason author/publisher information is stored with application data in the segmented portion of scan database 112 is that typically, counterfeit applications do not have the correct publisher information associated with them. Therefore, when a downloaded application needs to be verified, secure charger 124 will send the name of the application to backend server 104 using the Internet connectivity of mobile smart device 128. Backend server 104 will connect to the segmented portion of scan and database 112 and retrieve the appropriate author/publisher information and send the author's publisher's public key to secure charger 124 to conduct the verification process. This public key will be saved in the local database of secure charger 124 so that it may be used for future verifications of this application. This process will be described in greater detail subsequently.

The system and method of the present invention also permits applications and services to trust the mobile smart device on which applications are downloaded. Typically, when a mobile smart device user uses an application through a login to a remote service, the author/publisher of the application and the service assume the mobile smart device is secure and authorized to receive the application. However, there is no way to confirm this.

According to system and method of present invention, application publishers and services can connect to a frontend server 106 to verify the mobile smart device is secure and authorized to receive the application or service. The verification process begins when secure charger 124 reports scan results internal network 102 through backend server 104. The scan results are stored in scan database 112 and these results will indicate whether or not the mobile smart device is "compromised." Also included with the scan results is the IMEI ("international mobile equipment identity") for the mobile smart device.

The scan will determine each application and the OS on the mobile smart device. The author/publisher information that is stored in the scan database will be associated with each application and the OS.

For purposes of an application verifying the mobile smart device, internal network 102 will generate and send to each author/publisher a service key to be used for verifying the mobile smart device on which that author's/publisher's particular application is downloaded. The service key will be associated with the appropriate author/publisher information stored in scan database 112 for each application. This information is stored in scan database 112 for logging and reporting, and to inform application publishers and services whether the mobile smart device is secure.

After a scan is conducted and the results are sent to internal network 102, the backend server 104 will determine if there is author/publisher information stored in the scan database for each application and the OS. If it is not found, internal network 102 will request it from the author/publisher.

Internal network 102 will send a service key to the author/publisher for each application or single service key for all of the author's/publisher's applications in scan database 112. Internal network 102 also may generate multiple service keys covering different numbers of the author's/publisher's applications in the scan database. These service keys will be stored in the scan database.

Preferably, the verification process is initiated when the mobile smart device seeks to run the application and access to the application must be granted by the remote service. The application will connect to the remote service using the Internet connectivity of the mobile smart device for the purpose of carrying out the login procedure and during the login procedure requests certain information to be sent from the remote service to internal network 102 for verification purposes.

More specifically, prior to the application sending any information to remote service, the application will request the mobile smart device provide login credentials, such as, the user name and password. When this is obtained, this information will be sent to the remote service for requesting access to the application. The application also send the mobile smart device IMEI.

Preferably, the information that is requested to be sent to internal network 102 for purposes of application/service verification includes, but is not limited to, the IMEI, service key, and service-specific data, including, but not limited to, username, password, and action, such as issuing warnings, charging fees, or other types of action to give notice if access is being denied. At a minimum, the remote service will send to frontend server 106 the IMEI, which is used by cellular networks to identify valid devices, and a service key, which identifies the author/publisher of the application. Using this information, frontend server 106 can make comparisons with information stored in scan database 116 relating to the IMEI and service key. Once this information is properly matched, the frontend server will send to the remote service whether the mobile smart device was "compromised," "not compromised," or "not recently scanned." It is understood that other status indicators could be sent and still be within the scope of the present invention. Upon receipt of the status indicator, the remote service will make a determination whether to grant the mobile smart device access to the application by accepting or rejecting a login request.

In order for comparisons with scan database information to be effective for applications to verify the mobile smart device is authorized for downloading the application, application authors/publishers should modify their applications so they will retrieve the mobile device's IMEI and send it along with login information to the remote service. However, other methods of obtaining the IMEI are contemplated and they are within the scope of the present invention as long as they result in applications being able to access IMEIs.

As stated, the present invention helps prevent the impersonation of a mobile smart device to improperly obtain information. The implementation of the present invention enables a service to check to determine if the IMEI of the attacker is one for a real mobile device. If it is not, the mobile device will not be viewed as a trusted mobile device. Further, once a mobile device is marked as "compromised" or "not recently scanned," the service will either deny access or take other punitive actions, such as issuing warnings, charging fees, or other types of actions, to give notice that access is denied.

The method for a mobile smart device "trusting" an application will now be described in detail referring to FIG. 3. FIG. 3, generally at 300, shows a representative flow diagram for determining whether a downloaded application can be trusted by the mobile smart device on which is downloaded. At step 302, publishers of applications transmit their signatures to internal network 102 through the frontend server 106. These signatures are stored in the segmented portion of scan database 112 and associated with each publisher's application(s). Preferably, the segmented portion of scan database 112 will include as much application/application publisher signature information as possible so the system will be prepared to verify as many applications as possible.

At step 304, mobile smart device 128 downloads one or more applications that need to be verified. At step 306, a secure charger 124 scan determines that there are downloaded applications. With knowledge of the downloaded application(s) through the scan, at step 308, secure charger 124 connects to internal network 102 through backend server 104 and queries the scan database for the publisher's public keys. Once secure charger 124 receives the appropriate publisher public keys, at step 310, it will check the first application to validate the publisher's signature. If the signature is validated, the process will move to step 312 and the application will be a trusted application. However, if the signatures do not match, the application will not be verified and the process will move to step 314 where the application will be tagged "do not trust application." If it is not a trusted application, then it may be removed and a notification sent to the system user and/or system administrator.

After determining whether the application is trusted or not, the process moves to the decision block of step 316, which determines whether this was the last application. If it is not the last application, the process will proceed to step 310 and check the next application to determine whether it is valid and can be trusted or not valid and not to be trusted. This is repeated until the last application is checked, after which, the process proceeds to step 318.

The method for application trusting a mobile smart device will now be described referring to FIG. 4. FIG. 4, generally at step 400, shows a representative flow diagram for determining if a downloaded application can trust the mobile smart device on which it is downloaded to be an authorized mobile smart device to receive it.

Figure 4:
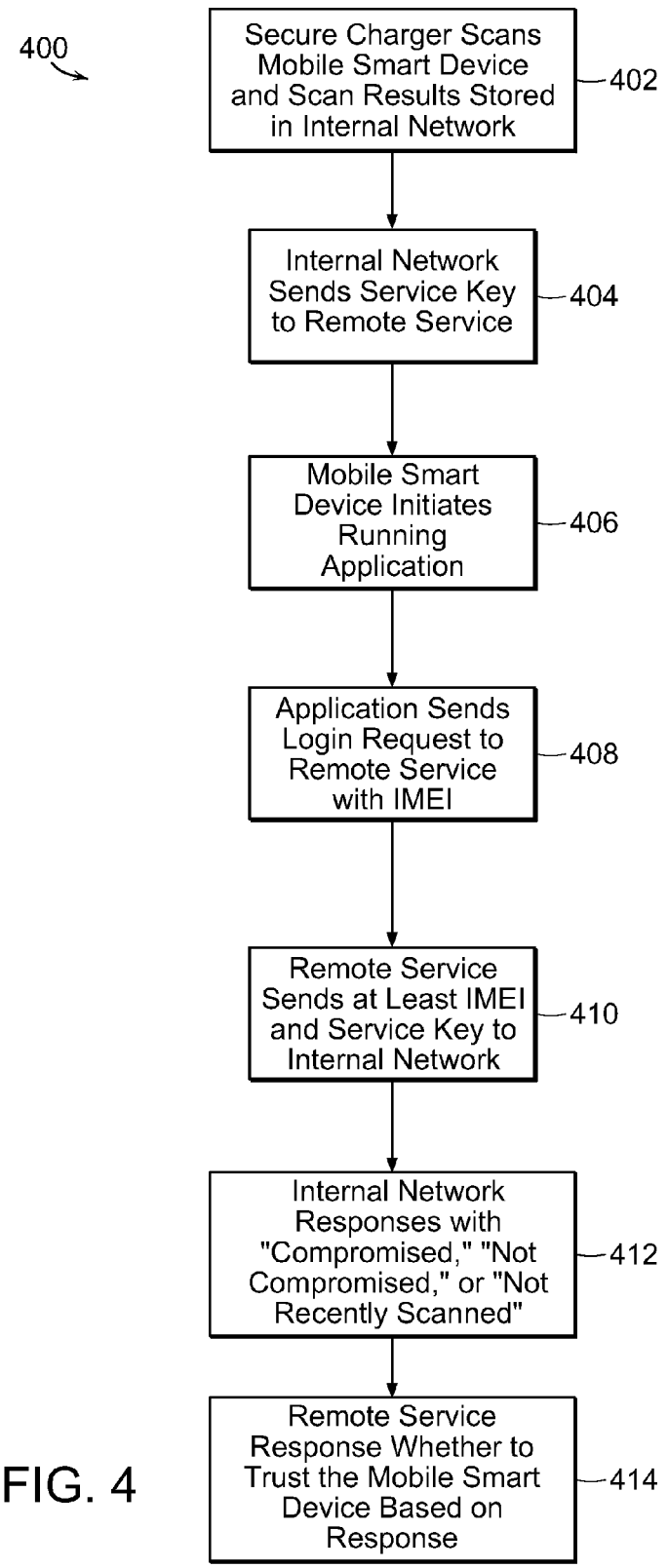
FIG. 4 shows a representative flow diagram for determining if a downloaded application can trust the mobile smart device on which it is downloaded is an authorized mobile smart device.

Referring to FIG. 4, at step 402, secure charger 124 conducts a quick or full scan and reports the results of the scan to internal network 102 though backend server 104 where it is then stored in scan database 112. Secure charger 124 also includes with scan results the IMEI of mobile smart device 128, which is stored in scan database 112 associated with the scan results.

The scan results will include a list of each application and the OS on mobile smart device 128. Backend server 104 will check to determine if author/publisher information is associated with each application and a service key assigned to each application. If not, frontend server 106 will contact the author/publisher for the author/publisher information. Once obtained, at step 404, firstend server 106 will send a service key to author/publisher of the application and the service key also will be stored in scan database 112 with the author/publisher information for use in the verification of mobile smart device 128.

When mobile smart device 128 initiates running a downloaded application at step 406, the downloaded application begins the process to verify whether mobile smart device 128 is trusted, and thereby authorized to receive and use the application. At step 406, the downloaded application requests login information, e.g., username and password, from mobile smart device 128. This information is entered on mobile smart device 128 by the mobile smart device user and application sends login information to a remote service along with the IMEI and service key.

The login information sent by the downloaded application to the remote service also includes a request for certain information to be sent to internal network 102. This information is includes, but is not limited to, the IMEI, service key, and service-specific data, including, but not limited to, username, password, and action. At a minimum, the remote service will send the IMEI and service key.

Based on the request sent by the downloaded application to the remote service, at step 410, the remote service sends at least the IMEI and service key to frontend server 106 of internal network 102 via authentication mechanism 120. Frontend server 106 queries scan database 112 for the appropriate IMEI and service key stored therein. If there is not a match, then the frontend server will transmit to the remote service that there was not a match and the verification process will end. However, it is contemplated that the system will permit the remote service to resubmit the IMEI and service key at least three times before finally ending the verification process. If there is a match of the IMEI and a service key, frontend server will retrieve the status of mobile smart device 128 whether it is "compromised," "not compromised," or "not recently scanned." Preferably, a mobile smart device is considered "not recently scanned" when it has not been scanned within three (3) days. However, it is understand "not recently scanned" may be more or less than three (3) days and still be within the scope of the present invention.

At step 412, frontend server 106 will connect to the remote service and provide the status with respect to mobile smart device 128, i.e., whether it is "compromised," "not compromised," or "not recently scanned." At step 414, based on the status, the author/publisher of the remote service will permit or deny the login request. A likely result would be that if the status that is returned is "compromised" or "not recently scanned," mobile smart device 128 would not be trusted and the login request would be denied. To the contrary, if the status that is returned is "not compromised," then mobile smart device 128 would be trusted and the login request would be granted. It is understood, however, that even if the status returned to the remote service was "compromised" or "not recently scanned," whether the author/publisher of remote service would grant access to the application may depend on many factors including which data would be at risk if access is granted.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

While several particular forms of the invention have been described, it will be apparent that various modifications are possible. It is not intended that the invention be limited to the particular embodiments described here. Other advantages and novel features of the invention may become apparent from the detailed description when considered in conjunction with the drawings.

The invention claimed is:

1. A computer-implemented system for electrically charging an electronic device and conducting an integrity analysis scan of the electronic device during at least a portion of the time period the computer-implemented system electrically charges the electronic device, comprising:

a housing for enclosing the computer-implemented system;

a power source connector for connecting the computer-implemented system to a power source;

an electrical power converter connected to the power source connector for converting the electrical power input to the power source connector to electrical power suitable for input to the electronic device for charging an electrical power storage means of the electronic device;

a controller for controlling operations of the computer-implemented system for at least conducting an integrity analysis scan of the electronic device with an electronic device baseline during at least a portion of the time period the computer-implemented system electrically charges the electronic device and for sending scan results to a backend server and receiving updates from the backend server;

a system memory connected to the controller for storing at least computer programs and data for at least conducting an integrity analysis scan of the electronic device with the electronic device baseline during at least a portion of the time period the computer-implemented system electrically charges the electronic device;

a secure digital card connected to the controller for storing at least operating system, computer-based security programs, and on-device database for the computer-implemented system at least conducting an integrity analysis scan of the electronic device with the electronic device baseline during at least a portion of the time period the computer-implemented system electrically charges the electronic device; and an electronic device connector of the computer-implemented system for connecting the computer-implemented system to the electronic device for providing converted electrical power to the electronic device suitable for charging the electrical power storage means thereon and for bidirectional communications between the computer-implemented system and electronic device for at least conducting an integrity analysis scan of the electronic device with the electronic device baseline during at least a portion of the time period the computer-implemented system electrically charges the electronic device and providing scan results from the electronic device to the computer-implemented system for storage on the secure digital card.

2. The computer-implemented system as recited in claim 1, wherein the power source includes an external power source.

3. The computer-implemented system as recited in claim 2, wherein the power source connector includes a prong set for connecting to an electrical wall outlet or a cable extending from the computer-implemented system with a universal serial bus ("USB") connector at a distal end thereof for connecting to a power source having a compatible USB connector.

4. The computer-implemented system as recited in claim 1, wherein the power source converter includes a transformer for converting alternating current ("AC") to direct current ("DC").

5. The computer-implemented system as recited in claim 1, wherein the controller includes a computer processing unit ("CPU").

6. The computer-implemented system as recited in claim 1, wherein the system memory includes a random access memory ("RAM").

7. The computer-implemented system as recited in claim 6, wherein the RAM includes storing running program code, data, and volatile system files.

8. The computer-implemented system as recited in claim 1, wherein the computer-based security programs include security analysis computer-based programs.

9. The computer-implemented system as recited in claim 1, wherein the computer-implemented system includes scanning for at least one from a group ,that includes viruses, malicious software ("malware"), rootkits, counterfeit software, systems configuration and setting changes, and exploits.

10. The computer-implemented system as recited in claim 1, wherein the computer-implemented system includes a status indicator to indicate whether returned scan results have identified at least one comparison difference in conducting the baseline scan of the electronic device thereby indicating the electronic device is compromised.

11. The computer-implemented system as recited in claim 10, wherein the status indicator includes at least one light emitting diode ("LED") light.

12. The computer-implemented system as recited in claim 10, wherein the status indicator includes a liquid crystal display ("LCD") that will indicate thereon at least whether returned scan results have identified at least one comparison difference in conducting the baseline scan of the electronic device thereby indicating the electronic device is compromised.

13. The computer-implemented system as recited in claim 1, wherein the electronic device includes a mobile smart device.

14. The computer-implemented system as recited in claim 13, wherein the mobile smart device is selected from a group including at least cellular phones, personal digital assistants, tablet devices, smartphones, mobile payment systems, mobile healthcare systems, handheld law, and enforcement systems.

15. A computer-implemented system for conducting an integrity analysis scan of an electronic device using at least a quick scan followed by a comprehensive full scan, comprising:
a housing for enclosing the computer-implemented system;
an internal power source for the powering computer-implemented system;
a controller for controlling operations of the computer-implemented system for at least the quick scan and comprehensive full scan for conducting the integrity analysis of the electronic device with, an electronic device baseline and wherein the comprehensive full scan includes a reboot of the electronic device into a trusted operating system to perform an integrity analysis while an electronic device operating system is not running;
a system memory connected to the controller for storing at least computer programs and data for conducting the quick scan and comprehensive full scan for conducting the integrity analysis of the electronic device with the electronic device baseline;
a secure digital card connected to the controller for storing at least the electronic device operating system, computer-based security programs, and on-device database for conducting the quick scan and comprehensive full scan for conducting the integrity analysis of the electronic device with the electronic device baseline; and
a transceiver connected to the controller for wireless bidirectional communications between the computer-implemented system and the electronic device for conducting the quick scan and comprehensive scan for conducting the integrity analysis of the electronic device with the electronic device baseline and receiving scan results from the electronic device for storage on the secure digital card.

16. The computer-implemented system as recited in claim 15, wherein the transceiver establishes a wireless connection with the electronic device using an 802.11 radio frequency ("RF") connection or Bluetooth connection.

17. The computer-implemented system as recited in claim 15, wherein, the internal power source which includes a battery.

18. The computer-implemented system as recited in claim 15, wherein the controller includes a computer processing unit ("CPU").

19. The computer--implemented system as recited in claim 15, wherein the system memory includes a random access memory ("RAM").

20. The computer-implemented system as recited in claim 19, wherein the RAM includes storing running program code, data, and volatile system files.

21. The computer-implemented system as recited in claim 20, wherein the computer-based security programs include security analysis computer-based programs.

22. The computer-implemented system as recited in claim 15, wherein the computer-implemented system includes scanning for at least one from a group that includes viruses, malicious software ("malware"), rootkits, counterfeit software, system configuration and setting changes, and exploits.

23. The computer-implemented system as recited in claim 15, wherein the computer-implemented system includes a status indicator to indicate whether returned scan results have identified at least one comparison difference in conducting the baseline scan of on the electronic device thereby indicating the electronic device is compromised.

24. The computer-implemented system as recited in claim 23, wherein the status indicator includes at least one light emitting diode ("LED") light.

25. The computer-implemented system as recited in claim 23, wherein the status indicator includes a liquid crystal display ("LCD") that will indicate thereon at least whether returned scan results have identified at least the comparison difference in conducting the baseline scan of the electronic device thereby indicating the electronic device is compromised.

26. The computer-implemented system as recited in claim 15, wherein the electronic device includes a mobile smart device.

27. The computer-implemented system as recited in claim 26, wherein the mobile smart device is selected from a group of including at least cellular phones, personal digital assistants, tablet devices, smartphones, mobile payment systems, mobile healthcare systems, handheld law, and enforcement systems.

28. A computer-implemented method for electrically charging an electronic device and conducting an integrity analysis of the electronic device during at least a portion of the time period the computer-implemented system electrically charges the electronic device, comprising the steps of:
(a) connecting an electrical power source to an electrical power input connector of a charging/scanner device with the charging scanner device for conducting the integrity analysis of the electronic device with an electronic device baseline while electrically charging electronic device, with the charging/scanner device including at least an electrical power converter, a controller, a system memory, a secure digital card, and an electronic device connector for connecting the scanning/charging device to the electronic device;
(b) converting with the electrical power converter the electrical power input to the scanning/charging device to electrical power suitable for input to the electronic device for charging an electrical power storage means of the electronic device;
(c) connecting the electronic device connector of the scanning/charging device to the electronic device for
(1) providing to the electronic device converted electrical power suitable for charging electrical power storage means of the electronic device, and
(2) establishing bidirectional communications over the connected electronic device connector for at least conducting the integrity analysis of the electronic device with the electronic device baseline during at least a portion of the time period the scanning/charging device electrically charges the electronic device and receiving scan results from the electronic device;
(d) conducting the integrity analysis of the electronic device with the electronic device baseline and sending scan results to a backend server and receiving updates from the backend server under the control of the controller during at least a portion of the time period the scanning/charging device electrically charges the electronic device according to,
(1) computer programs and data stored in a system memory, and
(2) an operating system, computer-based security programs, and on-device database on a secure digital card;
(e) receiving at the scanning/charging device integrity analysis results from the electronic device over the connected electronic device connector; and
(f) displaying the integrity analysis results using a status indicator on the scanning charging device.

29. The computer-implemented method as recited in claim 28, wherein the status indicator includes at least one light emitting diode ("LED").

30. The computer-implemented method as recited in claim 28, wherein the status indicator includes a liquid crystal display ("LCD") that will indicate thereon at least whether the returned scan results have identified at least one comparison difference in conducting the scan of the electronic device thereby indicating the electronic device is compromised.

31. The computer-implemented method as recited in claim 28, wherein the method includes scanning the electronic device for viruses during at least a portion of the time period the scanning/charging device electrically charges the electronic device.

* * * * *